Feb. 24, 1970  J. C. BURLESON ET AL  3,497,436
MANUFACTURE OF ALCOHOLS USING A SILENT ELECTRIC DISCHARGE
Filed Jan. 3, 1967
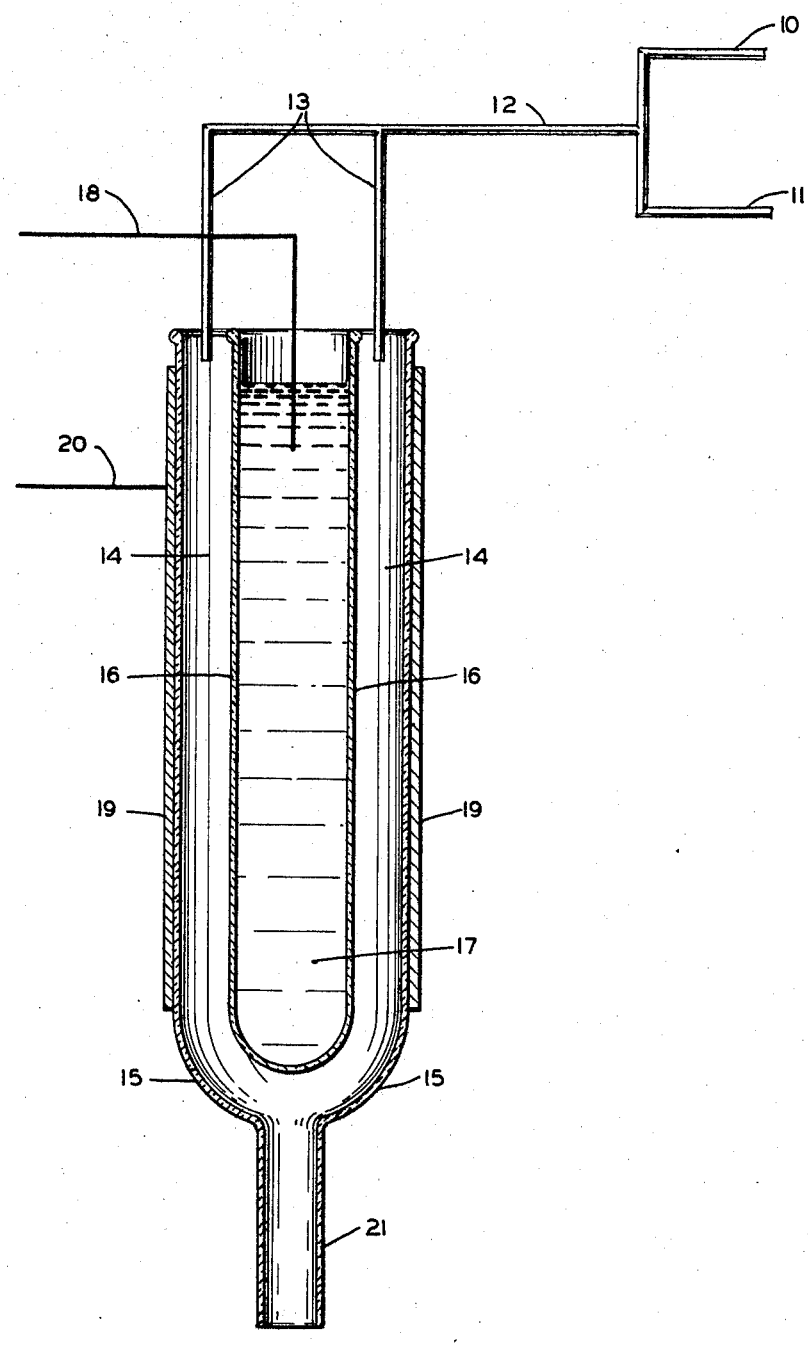
INVENTORS
JAMES C. BURLESON
WILLIAM F. YATES
BY
*M. M. Chan*
ATTORNEY United States Patent Office 3,497,436
Patented Feb. 24, 1970

3,497,436
MANUFACTURE OF ALCOHOLS USING A SILENT ELECTRIC DISCHARGE
James C. Burleson, St. Charles, and William F. Yates, Chesterfield, Mo., assignors to Monsanto Company, St. Louis, Mo., a corporation of Delaware
Filed Jan. 3, 1967, Ser. No. 606,759
Int. Cl. C07c 3/24
U.S. Cl. 204—168                          3 Claims

ABSTRACT OF THE DISCLOSURE

Paraffin hydrocarbons are converted to alcohols by subjecting the paraffin hydrocarbon and carbon dioxide under select conditions to a silent electric discharge.

---

The present invention relates to a process for the preparation of alcohols. More particularly, the present invention relates to a novel process for the non-catalytic direct synthesis of alcohols from carbon dioxide and paraffin hydrocarbons.

Alcohols, ranging from methanol to alcohols of 10 carbon atoms and more, find many applications in the chemical industry and are, therefore, in substantial demand. Many processes are available for the manufacture of alcohols such as the catalytic reaction of carbon monoxide and hydrogen to produce methanol and the well known "oxo" process for producing higher molecular weight alcohols. However, because of the demand for alcohols of a wide range of molecular weights, there is a need for a single process by which a wide range of alcohols may be produced merely by changing the feed. Also, there is always a need for new and improved processes for producing alcohols.

It is an object of the present invention to provide a new and novel process for the manufacture of alcohols. Another object of the present invention is to provide a novel process for the preparation of alcohols wherein carbon dioxide and paraffin hydrocarbons are non-catalytically converted to alcohols. An additional object of the present invention is to provide a new and novel low temperature, non-catalytic process for the conversion of carbon dioxide and paraffin hydrocarbons to alcohols. It is also an object of the present invention to provide a new and novel process for the preparation of alcohols of a wide range of molecular weights merely by changing the feed composition. Additional objects of the present invention will become apparent from the following description of the invention herein disclosed.

The present invention, which fulfills these and other objects, is a process which comprises subjecting a mixture of carbon dioxide and at least one paraffin hydrocarbon to a silent electric discharge. By the term "silent electric discharge," as used herein, is meant an electrical discharge of the silent type characterized by a relatively high voltage, a relatively low current density and a relatively low gas temperature as contrasted to the low voltage, high current, and high temperatures of the arc discharge.

In order to further describe the present invention, reference is made to the accompanying drawing which is a diagrammatic representation of an apparatus particularly suited to carrying out the process of the present invention. Referring to the drawing, carbon dioxide and a paraffin hydrocarbon are fed through lines 10 and 11, respectively, into a common line 12 wherein these components become intimately mixed. The mixture passes through line 12 into one or a plurality of distributing tubes 13 which serve to introduce the mixture into reaction chamber 14. Reaction chamber 14 is formed by the angular space between a glass outer tube 15 and glass inner tube 16, which glass inner tube 16 is sealed at its lower end and filled with an electrolyte solution 17 which may be any suitable conduction solution. Glass outer tube 16 is surrounded by a conducting material 19 usually as a sheet or a conducting metal such as, for example, aluminum foil. Electrolyte solution 17 and conducting metal 19 are connected by means of conducting wires 18 and 20, respectively, with an electrical power source (not shown). The electrical power source is one capable of supplying as high as 20,000 volts and higher of alternating current with a frequency range of 30 cycles to 2 megacycles per second. The gas mixture introduced through lines 13 into reaction chamber 14 passes downward through reactor chamber 14 and a high intensity electrical field created by a silent electrical discharge between electrolyte 17 and conducting material 19. The effluent of reaction chamber 14 is discharged through discharge tube 21 whereby it flows to a recovery system (not shown).

To further describe and to specifically illustrate the process of the present invention. The following examples are presented. These examples are not to be construed as limiting of the present invention.

EXAMPLE I

A mixture consisting of carbon dioxide and methane in equimolar quantities was subjected to a silent electrical discharge in an apparatus substantially as shown in the accompanying drawing. In this apparatus, aluminum foil was used as conducting material 19 surrounding glass outer tube 15 and a 1% $Na_2SO_4$ solution was used as the electrolyte 17 within glass inner tube 16. The distance between glass outer tube 15 and glass inner tube 16 was approximately 0.060 inch. The carbon dioxide-methane mixture was subjected to the silent discharge at substantially atmospheric pressure and at room temperature (70 to 80° F.). The voltage applied to the silient electric discharge was approximately 15,000 volts and the frequency of the applied electromotive force was approximately 60 cycles per second. The field strength of the silent electric discharge within the reaction zone was 100,000 volts per centimeter. The residence time of the reaction mixture within the field of the silent electric discharge was approximately 200 seconds. On an analysis of the effluent from the silient electric discharge apparatus, it was found that a significant quantity of methanol, representing approximately 50% by weight of the total reaction product, was formed. In addition, minor amounts of ethylene, acetylene, acetone, acetaldehyde and higher carbonyls were found to have formed.

EXAMPLE II

Example I was substantially repeated with the exception that ethane was used as the paraffin hydrocarbon. In this experiment, the principal product was ethanol representing approximately 40% by weight of the reaction product. Again, minor amounts of ethylene, acetylene, acetone, acetaldehyde and higher carbonyls were produced.

EXAMPLE III

Example I again was substantially repeated with the exception that propane was used as the paraffin hydrocarbon. The principal products were normal and iso-propanol in a molar ratio of 3:1, the total of the propyl alcohols representing approximately 50% by weight of the total reaction product. Minor amounts of ethylene, acetylene, acetone, acetaldehyde and higher carbonyls were again produced.

EXAMPLE IV

Example I was again substantially repeated with the exception that n-butane was used as the paraffin hydrocarbon. The principal products were normal and secondary-butanol in a molar ratio of 3:2, the total of the butanols representing approximately 50% by weight of the total reaction product. Minor amounts of ethylene, acetylene, acetone, acetaldehyde, and higher carbonyls were again produced.

EXAMPLE V

Example I was again substantially repeated with the exception that isobutane was used as the paraffin hydrocarbon. The principal product was isobutanol, with minor amounts of t-butanol also being formed. The butanols represented approximately 50% by weight of the reaction product. Again, minor amounts of ethylene, acetylene, acetone, acetaldehyde, and higher carbonyls were produced.

The feed materials to the process of the present invention consist of carbon dioxide and at least one paraffin hydrocarbon. Most often, the carbon dioxide and paraffin hydrocarbon are employed in a molar ratio of carbon dioxide to paraffin hydrocarbon within the range of 1:10 to 10:1. However, both higher and lower ratios may be used if desired. Since formation of the alcohol from the carbon dioxide and the paraffin hydrocarbon generally requires one mole of each of the reactants, it is usually preferred to employ more nearly equimolar quantities of the carbon dioxide and paraffin hydrocarbon, for example, molar ratios of carbon dioxide to paraffin hydrocarbon of 1:5 to 5:1 are preferably employed.

Paraffin hydrocarbons useful in carrying out the process of the present invention include a wide range of such hydrocarbons. As used herein, the term "paraffin hydrocarbons," is meant to include the cycloparaffin hydrocarbons as well as both the straight and branched-chain paraffin hydrocarbons. Non-limiting examples of paraffin hydrocarbons useful in carrying out the process of the present invention are methane, ethane, propane, n-butane, methylbutane, cyclobutane, n-pentane, methylpentane, dimethylbutanes, cyclopentane, n-hexane, methylhexane, dimethylhexane, ethylhexane, ethylpentane, methylcyclopentane, cyclohexane, methylcyclohexane, n-heptane, methylethylhexane, methylheptane, cycloheptane, dimethylcyclohexane, cyclooctane, n-octane, methyloctanes, n-nonane, dimethyloctane, methylethylnonanes, n-dodecane, and the like, up to and including paraffin hydrocarbons of 30 carbon atoms and higher. Since the process of the present invention requires the reactants to be in the gaseous phase, those paraffin hydrocarbons which may be readily gasified are usually more desired as feeds for the practice of the present invention. As a practical matter, the most useful paraffin hydrocarbon feeds to the process of the present invention are those containing 1 to 12 carbon atoms per molecule. These may be either straight-chain, branched-chain or cyclic and may be used singly or in admixture with one another. With respect to choosing the paraffin hydrocarbon feed to the present invention, it has been found that smaller quantities of secondary alcohols are produced when branched-chain paraffin hydrocarbons are used as the feed than when straight-chain paraffin hydrocarbon feeds are used.

The temperatures at which the process of the present invention is practiced are not particularly critical. The specific temperature used is most often dictated by the temperatures required to vaporize the paraffin hydrocarbon. When the paraffin hydrocarbon feeds to the present process are the normally gaseous paraffin hydrocarbons, the process of the present invention is most often operated at ambient temperatures (70 to 80° F.). As the molecular weight of the paraffin hydrocarbon in the feed increases, it is usually necessary to increase the reaction temperature in order to maintain the reactants in the gaseous state. As a practical matter, the present invention is seldom operated at temperatures above 600° F. With the above defined preferred feeds to the process of the present invention, temperatures within the range of 20 to 200° F. are usually employed.

As with temperature, pressure is not particularly critical to the operation of the present invention. The pressure is usually at or near atmospheric pressure, i.e., 0 to 5 p.s.i.g. However, it may be desired to operate at both higher and lower pressures in order to facilitate the mechanical carrying out of the process of the present invention. For example, it may be desired to operate the process of the present invention under reduced pressures, i.e., as low as 20 mm. Hg and lower in order to facilitate vaporization of the reactants within the reaction zone and to retard the frequency of collision of the reactant particles within the reaction zone. On the other hand, it may be desired to operate at superatmospheric pressures, i.e., as high as 200 p.s.i.g. and higher, in order to reduce the vapor pressure of reactants within the reaction zone and to promote the collision frequency of the reactant particles. As a practical matter, the present invention is seldom operated at pressures lower than 1.5 p.s.i.a. or higher than 175 p.s.i.a.

The flow rate of the carbon dioxide-paraffin hydrocarbon feed mixture through the high intensity electric field produced by the silent electric discharge most often is such as to result in a residence time of the reaction mixture within said high intensity electric field of 0.1 second to 20 minutes. Preferably, however, flow rates or other conditions, are adjusted to provide a residence time of 0.5 to 100 seconds of the reactant mixture within the high intensity electric field.

The electrical conducting media through which the silent electric discharge is generated may consist of any material which may act as an electrode. Such materials are well known to the art and any of the conventional materials may be used. Such materials include various metals such as the aluminum foil mentioned above or various electrolytic solutions such as the above-mentioned sodium sulfate solution. The two electrical conducting media used may be the same or different depending upon the configuration and construction of the apparatus used in carrying out the process of the present invention. Since materials and electrolytic solutions capable of conducting electricity and as acting as electrodes are well known to the art, no further discussion of such conducting media is believed necessary herein.

An insulating medium generally is required between the two electrodes employed in providing the silent electric discharge of the process of the present invention. In the apparatus shown in the accompanying drawing, this insulating medium is provided by glass tubes 15 and 16 which each provide a layer of glass between the electrodes. It is not necessary that the electrodes be insulated from one another by two layers of insulation as in the apparatus of the drawing. It is only necessary that one insulating medium be provided and the reactants may be in direct contact with one of the electrodes. The choice of the insulating medium is not critical and is well within the ability of those skilled in the art. It is only necessary that the insulating material have a dielectric greater than that of the gaseous reactants. Included within this group of insulating materials are glass, various ceramic materials and the like.

In providing the silent electric discharge of the process of the present invention, a field strength voltage from about 20,000 to 150,000 volts per centimeter most often is required. "Field strength," as used herein is the value obtained by dividing the voltage applied to the electrodes by the distance between the two electrodes and is a measure of the electromotive force within the reaction zone. The field strength required will vary somewhat with the distance between the electrodes, the residence time and the reactants involved, as well as the efficiency of contact of the reaction mixture with the high intensity electrical field generated by the silent electric discharge. A preferred field strength for operation of the process of the present invention is one within the range of 30,000 to 125,000 volts. Generally, the frequency of the electric current in the operation of the present process is within the range of 30 cycles to 2 megacycles per second. However, a frequency within the range of 40 to 100 cycles per second is preferred.

The apparatus used in carrying out the present invention may vary considerably. Any apparatus which will provide a silent electric discharge across a gap through which the reaction mixture of the present process may be passed will suffice. The gap may vary in distance from a small fraction of an inch to several inches. The optimum gap distance will vary with the electrode and the voltage applied, as well as other factors well known to the art. A useful apparatus is one of the general configuration illustrated by the accompanying drawing. Of course, any number of variations of such an apparatus may be made without departing from the spirit and scope of the present invention. The primary concern is to provide an apparatus which is consistent with efficient utilization of the electrical energy.

What is claimed is:

1. In a non-catalytic process which comprises subjecting a gaseous mixture comprising at least one saturated hydrocarbon and carbon dioxide to the action of silent electric discharge, the improvement for selectively producing alcohols which comprises applying a silent electric discharge having a field strength within the range of 20,000 to 150,000 volts per centimeter wherein the reaction is carried out at a temperature of no greater than 600° F., at a pressure within the range of 20 mm. Hg to 200 p.s.i.g., the carbon dioxide and paraffin hydrocarbon molar ratio is within the range of 1:10 to 10:1, and the frequency of the silent electric discharge is within the range of 30 cycles to 2 megacycles per second, and wherein the residence time of the gaseous reactants within the field of the silent electric discharge is within the range of 0.1 second to 20 minutes.

2. The process of claim 1 wherein the paraffin hydrocarbons have 1–30 carbon atoms per molecule.

3. The process of claim 2 wherein the paraffin hydrocarbons have 1–12 carbon atoms per molecule.

References Cited

UNITED STATES PATENTS

| 1,986,885 | 1/1935 | Finlayson et al. | 204—169 |
| 2,191,797 | 2/1940 | Matheson | 204—168 |
| 2,944,951 | 7/1960 | Moe et al. | 204—165 |
| 3,205,162 | 9/1965 | MacLean | 204—312 |

ROBERT K. MIHALEK, Primary Examiner

U.S. Cl. X.R.

204—165; 260—632